: 3,669,514
Patented June 13, 1972

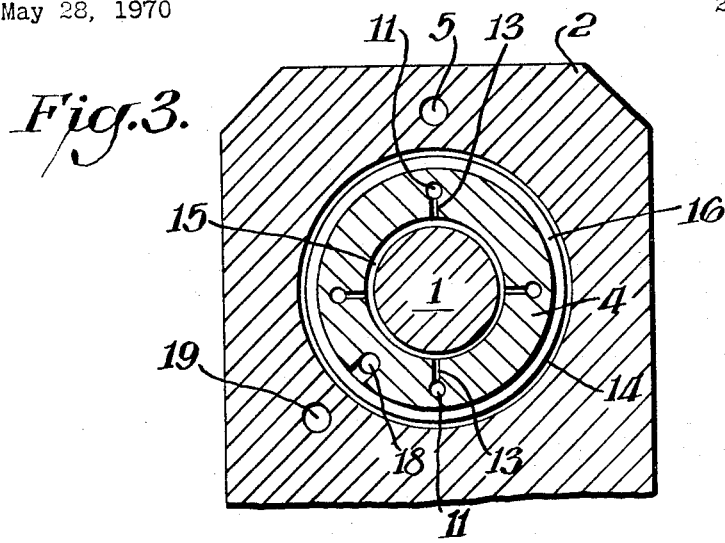
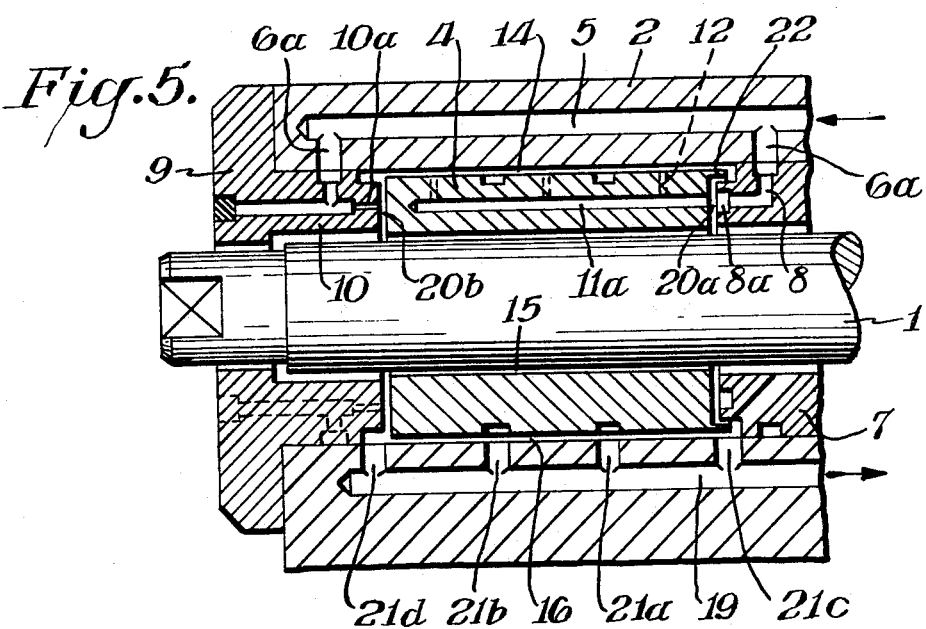
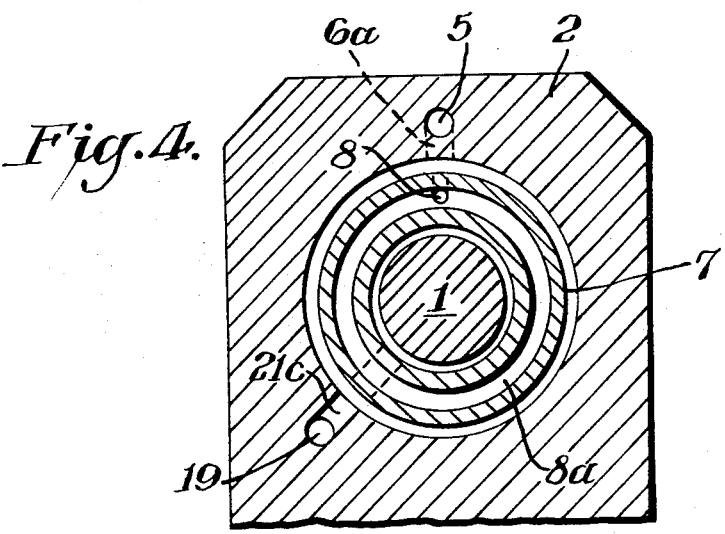

3,669,514
GASEOUS BEARING WITH STABILIZER
Ryuji Wada, Hiroshi Suzuki, and Masuo Nakato, Asahi-machi, Japan, assignors to Toyoda Koki Kabushiki Kaisha (trading as Toyoda Machine Works, Ltd.)
Filed May 28, 1970, Ser. No. 41,440
Claims priority, application Japan, May 30, 1969,
44/50,662
Int. Cl. F16c 17/16
U.S. Cl. 308—9
4 Claims

ABSTRACT OF THE DISCLOSURE

Present invention relates to gas bearing with stabilizer intended to elevate occurence range of whirl phenomenon thereby reliably preventing deterioration of rotating accuracy due to phenomenon and seizure of bearings to extend service life of gas bearing for high speed rotation at several tens of thousands to several hundred thousands revolutions per minute. Gas bearing has rotating shaft surrounding housing with bearing bush inserted between shaft and housing so that clearance of gas film are provided on inside and outside of bearing bush. Bearing bush has inclined nozzles which incline in direction opposite to rotation of shaft. Pressurized gas is supplied through nozzles to rotate bearing bush at appropriate speed and in same direction as rotating shaft. Gas lubricating film is formed by pressurized gas at internal and external clearances of bearing bush whereby rotating shaft is supported by bearing bush on film.

BACKGROUND OF THE INVENTION

The present invention relates to a gas bearing construction for a high speed rotating shaft.

As is well-known, in a gas bearing a pressurized gas is supplied to the clearance between the bearing and the rotating shaft, and the static pressure of a gas film formed in these clearances supports the rotating shaft. This bearing has the merits of extremely small bearing friction and good rotating accuracy. It has, however, the drawback in that these merits are lost because of the whirl phenomenon when the rotating shaft spins at a high speed of several tens of thousands to several hundred thousands revolutions per minute. This whirl phenomenon has become known as half-frequency whirl, usually assuming a mode of harmonic vibration of ½ rotation. Under high speed exceeding a certain value of r.p.m., the shaft begins to revolve at a rate of ½ its rotation whereby the axis of the shaft follows an orbit with a certain eccentricity as radius. In a static gas bearing under high speed rotation, the whirl is specially related to the dynamic effect of the gas film. Namely, this dynamic effect substantially changes the static pressure distribution of the bearing and the whirl hazard is said to increase when approximately 90° phase difference develops between the direction of the resultant force due to the dynamic pressure and the direction of shaft displacement. In a state of whirl, the shaft rotation is very unstable and the proper rotation accuracy is lost. When this phenomenon develops further, the gas lubricating film is broken thereby causing a metallic contact between the shaft and the bearing and inevitably leading to a seizure of the bearing.

It is known that this whirl phenomenon occurs when the shaft rotation exceeds a certain limit and its occurrence depends on the bearing rigidity. A device free from the whirl phenomenon has been strongly demanded from many industrial circles.

Accordingly, the primary object of the present invention is to solve the problem of whirl phenomenon in a gas lubricating bearing.

Another object of this invention is to provide a high-speed rotation bearing with high stability and high accuracy.

SUMMARY OF THE INVENTION

In accordance with the present invention, a bearing bush is floatingly inserted between a housing and rotating shaft. A gas lubricating film is formed in the clearances between the housing and the bearing bush and between the bearing bush and the rotating shaft. The bearing bush is caused to rotate in the same direction as the rotating shaft. With the relative velocity reduced between the rotating shaft and the bearing bush, the dynamic effect on the gas film is mitigated and in consequence the whirl-occurring boundary of r.p.m. is elevated. Thus, the high speed rotation of the rotating shaft is stabilized with increased accuracy.

BRIEF DESCRIPTION OF THE DRAWING

Novel features and advantages of the present invention in addition to those mentioned above will become apparent to those skilled in the art from a reading of the following detailed description in conjunction with the accompanying drawing wherein:

FIG. 3 is a sectional view taken along line 3—3 of FIG. 1;

FIG. 4 is a sectional view taken along line 4—4 of FIG. 1; and

FIG. 5 is a sectional view similar to FIG. 1 of another embodiment of the present invention.

DETAILED DESCRIPTION OF THE INVENTION

Figure 1:
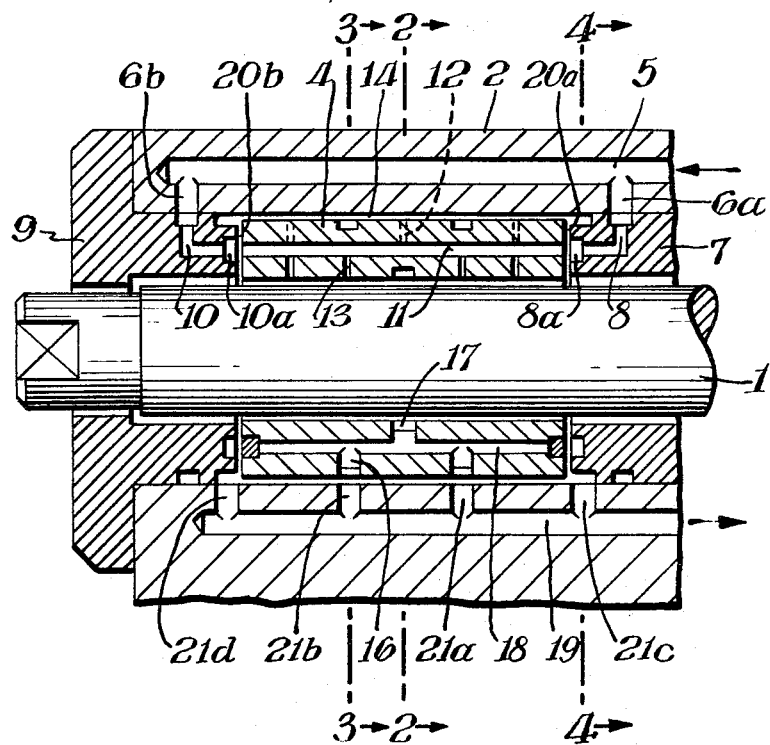
FIG. 1 is a longitudinal sectional view of one embodiment of the invention taken along line 1—1 of FIG. 2.
Figure 2:
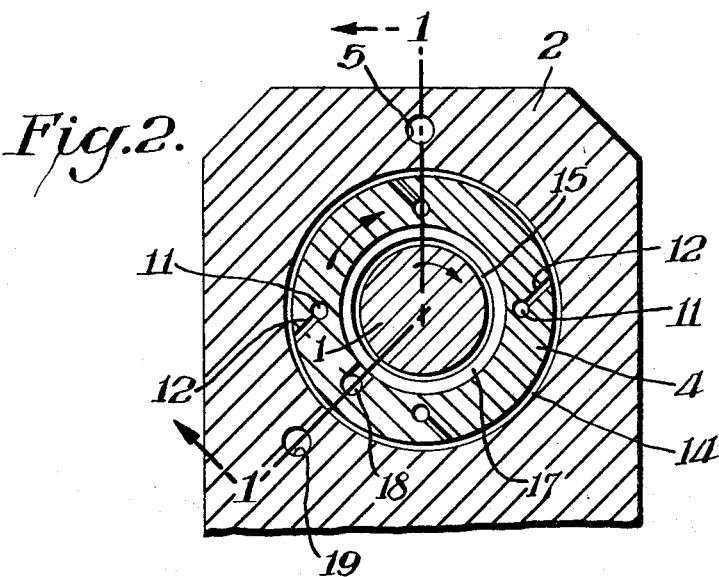
FIG. 2 is a sectional view taken along line 2—2 of FIG. 1.

Referring to FIGS. 1 through 4, one embodiment of this invention comprises a rotating shaft 1 rotated at a high speed by a suitable drive motor (not shown). A bearing bush 4 is floatingly inserted radially between a housing 2 and the rotating shaft 1. Small clearances 14, 15 are formed between the inside of the housing 2 and the outside of the bearing bush 4 and between the inside of the bearing bush 4 and the outside of the rotating shaft 1. Annular members 7 and 9 are fixed opposite both end faces of the bearing bush 4 within the housing 2. Both ends of the rotating shaft 1 rotatably penetrate these support cylinders 7 and 9.

The thick wall of the housing 2 is axially bored with a supply passage 5 and an exhaust passage 19. Through the wall of the bearing bush 4 run a plurality of supply passages 11 (best shown in FIG. 2) and one exhaust passage 18, the opposite ends of which are blocked by plugs. The supply passages 11 are longitudinally arranged on the circumference at equal intervals. A plurality of parallel nozzles 13 branch off from the supply passages 11 toward the internal clearance 15 in radial direction, that is, toward the axis of shaft. On the other hand, a large number of inclining nozzles 12 branch off at certain angles of inclination in parallel toward the external clearance 14. The inclining nozzles 12 and the nozzles 13 open respectively into the clearances 14, 15. The inclining nozzles 12 are inclined in a direction opposite to the rotating direction of the rotating shaft 1 and their inclination is appropriate. A jet stream of the pressurized gas out of the inclining nozzles 12 gives the bearing bush 4 a torque of the same direction as the arrow direction in FIG. 2, i.e., the rotating direction of the rotating shaft 1.

In the bearing bush 4 is axially bored the exhaust passage 18 which is connected via the annular groove 16 to the external clearance 14 and via the annular groove 17 to the internal clearance 15. The pressurized gas in the exhaust passage 18 is introduced through the transverse passages 21a and 21b to the exhaust passage 19 axially bored in the housing 2. On the supply side, passages 8 and 10 are formed in the annular members 7 and 9, respectively; to send the pressurized gas from the supply passage 5 to the supply passages 11 in the bearing bush 4. These passages are arranged to transmit the pressurized gas via the branch passages 6a and 6b in the housing 2 from the supply passage 5.

The annular grooves 8a and 10a, connected with the passages 8 and 10, respectively, are formed on the ends of the annular members 7 and 9, respectively, in communication with supply passages 11 whereby the pressurized gas introduced into the passages 8 and 10 is supplied via the annular grooves 8a and 10a to the supply passages 11 regardless of the rotation of the bearing bush 4. Clearances 20a and 20b are formed between the end faces of the bearing bush 4 and the opposite faces of the annular members 7 and 9. The gas supplied from the passages 8 and 10 fills these clearances to provide gas lubricating films which maintain the bearing bush 4 axially in position and provide an effect of reducing the friction. These clearances 20a, 20b communicate via the passages 21c, 20d with the exhaust passage 19.

The function of the embodiment illustrated in FIGS. 1–4 is as follows. When the rotating shaft 1 begins to rotate, the supply valve and the exhaust valve (both not shown) come into action. The gas is supplied through the supply passage 5 of the housing 2. Following the branch passages 6a and 6b, the pressurized gas is introduced into the L-shaped passages 8 and 10 within the annular members 7 and 9 to fill the whole circumference with annular grooves 8a and 10a supplied to the clearances via inward and outward nozzles 13 and 12 of the supply passages 11 in the bearing bush 4. The pressurized gas ejected out of the nozzles 13 forms a static gas lubricating film in the internal clearance 15, while the external clearance 14 is filled with the pressurized gas through the inclining nozzles 12. Static pressures of these gas films floatingly support the bearing bush 4 and the rotating shaft 1 in the housing 2.

In the present invention, the bearing bush 4 is rotated by gas jet from the inclining nozzles 12 in the same direction as the rotating shaft 1. The rotating speed is appropriately set or adjusted depending upon the nozzle diameter, the supply pressure, the inclining angle, and the number of nozzles. The rotating speed of the bearing bush 4 can be set at an adequately small value in relation to that of the rotating shaft 1. Thus, with appropriate reduction of the relative velocity between the rotating shaft 1 and the bearing bush 4, the limitation for whirl development due to high-speed rotation of the shaft 1 can be elevated and as the result, without exceeding the whirl limitation, the rotating shaft 1 can be rotated with stability to a higher range of speeds. Meanwhile, the static gas film formed in the external clearance 14 exerts a damping effect on the whirl motion of the rotating shaft 1. Thus, the shaft can maintain the desired accuracy in rotation and stability.

In the above device the internal and external clearances 15 and 14 are supplied with gas from the same supply line. It is also possible to use separate supply lines for each clearance. In that case an advantage in designing is obtained as the bearing rigidity of the housing 2 can be easily changed.

Another embodiment of the present invention is shown in FIG. 5. Unlike the preceding embodiment, in the embodiment of FIG. 5, the supply passage 11a bored in the bearing bush 4 is sealed blind at one end. The inclining nozzle 12 bored branching off the path 11a communicates only with the external clearance 14 and there is no nozzle which communicates with the internal clearance 15. Accordingly, the rotating shaft 1 is supported by the dynamic pressure at the internal clearance relative to the bearing bush 4. Meanwhile, the annular member 9 on the sealed side of the bearing bush 4 is provided with a nozzle 10a therein to supply the pressurized gas to the clearance 20b. The side thrust of the bearing bush 4 is supported by a pressurized gas film in the clearance 20b to balance the bearing bush 4 in the thrust direction. The nozzle 12 communicating with the external clearance 14 is, just like the one in the first embodiment, inclined opposite in direction to the rotation of the rotating shaft 1 thereby elevating the boundary of whirl occurrence under high speed rotation of the rotating shaft 1 as in the preceding embodiment. Thus, it is clear that the rotating shaft 1 can be supported either by the static gas film, as in the first embodiment, or by the dynamic gas film, as in the second embodiment. In the second embodiment, it is so designed that the pressurized gas may not leak out of the opening of the supply passage 11a in the bearing bush 4, i.e., a flange 22 is provided projecting around the periphery of the opposite face of the annular member 7 to the opening of the supply passage 11a. Thus, the pressurized gas can be effectively supplied to the opening of the supply passage 11a via the supply passage 5, the branch passage 6a, the passage 8, and the annular groove 8a.

As described above, according to the present invention, a bearing bush 4 rotatable at appropriate speed in the same direction as the rotating shaft 1 is floatably inserted between the rotating shaft 1 and the housing 2. A gas lubricating film is formed in the internal and external clearances 15 and 14 on the bearing bush thereby supporting both the bearing bush 4 and the rotating shaft 1. Thus, the effect of automatically aligning the rotational axis against a whirl motion and damping the whirl motion can be given. At the same time, the limitation for whirl occurrence of the rotating shaft 1 at high speed can be elevated through the rotation of the bearing bush 4. Thus, deterioration of rotational accuracy of the rotating shaft 1 due to the whirl phenomenon and seizure of the bearing due to the loss of gas film can be reliably prevented thereby assuring long service life of a stable highly accurate high speed gas bearing. Moreover, the bearing bush 4 can be balanced in the thrust direction too. These merits are attributed to the bearing of this invention.

What is claimed is:

1. A gas bearing comprising a housing having a gas supply passage and a gas exhaust passage for pressurized gas, a rotating shaft rotatably supported within the housing, a bearing bush floatingly inserted between the housing and the rotating shaft in the path of pressurized gas flow from the supply to the exhaust passage so that a thin film of the pressurized gas causes clearances between the bearing bush and the housing and the bearing bush and the rotating shaft, and nozzle means associated with the bearing bush in the path of pressurized gas flow for rotating the bearing bush in the same direction as the rotating shaft.

2. A gas bearing as in claim 1 wherein the bearing bush includes a gas supply passage and a gas exhaust passage, the nozzle means extending from the gas supply passage in the bearing bush toward the housing and toward the rotating shaft, the pressurized gas from the supply passage passing the clearances around the bearing bush and flowing via the gas exhaust passage in the bearing bush into the exhaust passage in the housing.

3. A gas bearing as in claim 1 wherein the nozzle means comprises a plurality of inclined nozzles in the bearing bush, each nozzle being inclined in a direction away from direction of rotation of the rotating shaft whereby the bearing bush is caused to rotate in the same direction of the rotating shaft when pressurized gas flows through the nozzles.

4. A gas bearing as in claim 1 wherein the bearing bush has a gas supply passage closed at one end thereof, and the nozzle means only extends from the gas supply passage to the clearance between the bearing bush and the housing, the rotating shaft being supported by dynamic pressure at the clearance between the rotating shaft and the bearing bush.

References Cited
UNITED STATES PATENTS
3,365,958   1/1968   Bond et al. _____ 308—9

MARTIN P. SCHWADRON, Primary Examiner
F. SUSKO, Assistant Examiner